H. C. Bradford,
Cotton Seed Huller.

No. 111,034. Patented Jan. 17, 1871.

Witnesses
Phil. N. Sarner
Frank A. Jackson

Inventor.
Horace C. Bradford,
By Wm. C. Wood
Attorney.

UNITED STATES PATENT OFFICE.

HORACE C. BRADFORD, OF PROVIDENCE, RHODE ISLAND, ASSIGNOR TO HIMSELF AND H. N. FENNER, OF SAME PLACE.

IMPROVEMENT IN COTTON-SEED HULLERS.

Specification forming part of Letters Patent No. 111,034, dated January 17, 1871.

*To all whom it may concern:*

Be it known that I, HORACE C. BRADFORD, of the city of Providence, in the county of Providence and State of Rhode Island, have invented a new and useful Improvement in Cotton-Seed Hullers.

My invention consists in the novel construction and arrangement of the concave beds with relation to the hulling-cylinder; and I do hereby declare that the following specification, taken in connection with the drawings furnished and forming a part of the same, is a true, clear, and exact description thereof.

Figure 1:
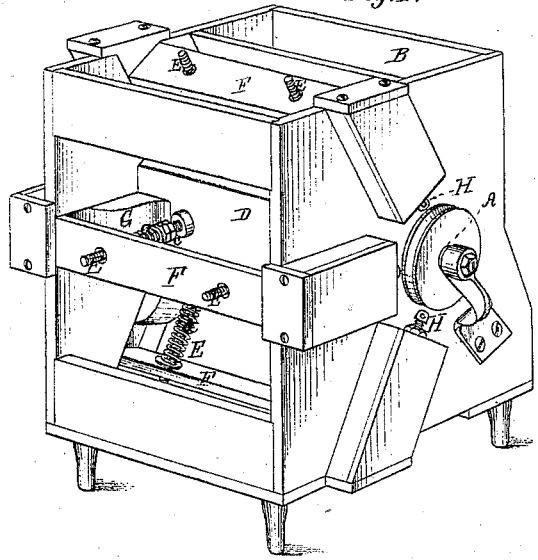
Figure 3:
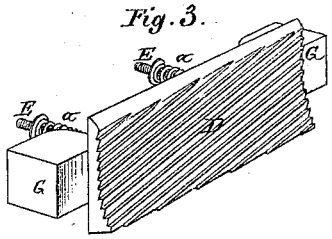
Figure 2:
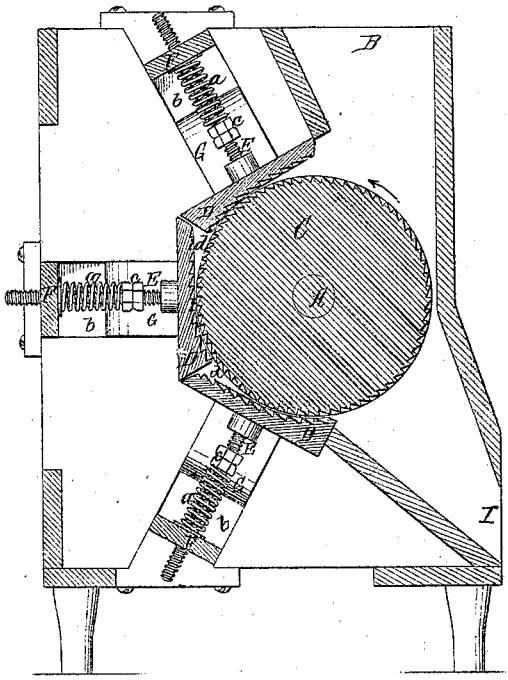

Reference being had to the drawings, Figure 1 represents one of my improved cotton-seed hullers in perspective. Fig. 2 represents the same in cross vertical section. Fig. 3 represents one of the concave beds.

The same letters of reference are used in all the figures.

A is the shaft on which the hulling-cylinder is mounted. It is supported in suitable bearings at each end of a case or frame-work.

B is the opening through which the seeds are fed.

C represents the hulling-cylinder. It should be made of cast-iron, and have its peripherical surface covered with spiral triangular grooves having sharp edges.

D in each case represents a segmental concave bed. There are three of these, numbered respectively, which combined occupy a semicircular space about equal to one-half of the circumference of the hulling-cylinder. The inner faces of these beds are grooved in a manner corresponding with the cylinder C, with the exception that these grooves cross those of the cylinder at oblique angles.

E in each case represents the screw-dowels on which the concave beds are mounted, each bed being provided with two, one near each end.

F in each case represents a pressure-bar, through openings in which the screw-dowels E pass. Each of these dowels is encircled by an expansion spiral spring, *a*, and nuts *c c*. These springs are arranged to bear between one of these nuts and the under side of the pressure-bars F.

G in each case represents a wing at each end of each of the concave beds D. These wings are fitted to enter recesses formed in the sides of the frame, indicated by letter *b* in each case.

H in each case represents a graduating-screw, which passes into the recess *b* and engages with the inner face of the wing G, thereby regulating the distance between the face of the bed D and the surface of the cylinder.

I is the aperture from which the hulled seeds are delivered.

It will be observed that each of the beds D has little more than half of its face concave, the balance being on a line tangential to the periphery of the cylinder, forming spaces *d* between each of the beds.

The operation of the machine is as follows: The seed are fed into the opening B, and are carried by the grooves in the cylinder C into the first space *d*, and in contact with the grooves on the face of the first bed D. As the grooves cross each other at oblique angles there is a cutting or shearing effect. The kernels of the seeds being of an average size, the beds are set by the screws H at such a distance from the cylinder as would admit of the free uninterrupted passage of the hulled seed. The springs *a* are graduated by the nuts *c c* so that the beds will resist such pressure as is requisite to tear the hull, and at the same time to yield upon the introduction of stones, nails, or other similar unyielding substances, and thereby prevent injury to the machine.

I am aware that there is a great variety of cotton-seed hullers having grooved or corrugated cylinders and correspondingly-corrugated concave beds, and that the beds have been so mounted as to yield when any unyielding foreign substance was introduced among the seed. When there are no foreign substances introduced, if the bed be in one unbroken section, it often occurs that seeds being held so firmly by the grooves in the cylinder will be carried through the machine with but one-half of the hull removed. With my improved huller this cannot well occur, for in each of the spaces *d* the seed become detached from the cylinder, and when next engaged between the cylinder and the bed they are in a changed or new position, and the removal of the hull is positively secured. Should a stone be among the seed, the first bed D would be thrown back, and until the stone had passed into the second space *d* seeds would pass through unbroken, after which, however, the work of that bed would be properly resumed, and next in order the second bed D would in like manner be thrown out while the first and third beds were performing their work in a proper manner, and so on to the final delivery of the stone. It is obvious that no more unbroken seeds can pass through than passed with the stone by the first bed D, for immediately after it would proceed to perform its work as before the stone entered.

I am also aware that in rice and coffee hulling machines there have been used, in combination with the cylinder, a series of clearers mounted upon yielding springs, and therefore I do not broadly claim such combination; but I do claim—

The improved cotton-seed huller herein described, consisting of the corrugated cylinder C and the series of yielding beds D, each of which is mounted upon adjustable springs $a$, and provided with a concave and tangential face, forming, when arranged as shown, the alternate spaces $d$, the whole constructed and operating substantially as described.

HORACE C. BRADFORD.

Witnesses:
  CHARLES SELDEN,
  JOHN C. PURKIS.